United States Patent [19]
Barten

[11] 3,990,284
[45] Nov. 9, 1976

[54] METHOD OF AND DEVICE FOR CONTROLLING THE PLANENESS OF BAND-SHAPED MATERIAL

[75] Inventor: Ernst H. Barten, Kreuztal, Germany

[73] Assignee: Schenbach Buschhetten, GmbH, Kreuztal, Germany

[22] Filed: Jan. 14, 1976

[21] Appl. No.: 648,912

Related U.S. Application Data

[63] Continuation-in-part of Ser. No. 510,545, Sept. 30, 1974, abandoned.

[30] Foreign Application Priority Data
Oct. 3, 1973    Germany............................ 2349611

[52] U.S. Cl. .......................................... 72/9; 72/13; 72/200
[51] Int. Cl.[2] ........................................ B21B 37/10
[58] Field of Search .................................. 72/6–13, 72/201, 202, 200; 100/47

[56] References Cited
UNITED STATES PATENTS
| | | | |
|---|---|---|---|
| 3,078,747 | 2/1963 | Pearson | 72/9 |
| 3,587,265 | 6/1971 | Sivilotti | 72/8 |
| 3,802,237 | 4/1974 | Albensi et al. | 72/200 X |

Primary Examiner—Milton S. Mehr
Attorney, Agent, or Firm—Walter Becker

[57] ABSTRACT

A method of and device for controlling the planeness of band-shaped material, according to which the band to be rolled is, in a continuous manner, passed into the roller gap of and between two rollers while the temperature of the band being rolled is measured over the width thereof directly behind the roller gap. The thus ascertained or measured values are used for creating pulses to control the bending of the rollers and/or the cooling of the rollers.

20 Claims, 5 Drawing Figures

METHOD OF AND DEVICE FOR CONTROLLING THE PLANENESS OF BAND-SHAPED MATERIAL

This is a continuation-in-part of co-pending application Ser. No. 510,545— Barten, filed Sept. 30, 1974, now abandoned.

The present invention relates to a method of and device for controlling the planeness when cold rolling band-shaped material in a rolling stand.

One of the most important requirements concerning the quality of a band-shaped material cold rolled in a rolling stand consists in a good planeness of the rolled band. It is known that a faulty planeness is caused either by an unsuitable heat band or by a faulty rolling in the rolling stand. The result of non-planeness consists either in beads occurring directly during the rolling operation or beads which occur when cutting the band. Inasmuch as such beads occurring in the rolling direction in view of a change in shape, cannot sufficiently be eliminated during the post rolling or straightening of the bands, regardless of whether such beads occur along the longitudinal center of the band or at the lateral edges thereof, it is necessary to prevent the occurrence of beads by faulty rolling in the rolling stand. A geometric grasping of the errors in planeness is not possible in view of the smoothening influence of the band tensions. A comparative measuring of the distribution of the band thickness over the width of the band has heretofore not brought about the desired result. Therefore, a planeness measuring device on the principle of wire strain gauges has been suggested by means of which the distribution of the pull stress over the width of the band is measured.

It has furthermore become known that due to the change in shape of the band during the rolling operation, the rollers themselves are heated up over their length to such an extent that the increase in temperature furnishes an indication for the shaping operation during the rolling operation. A greater form shaping work brings about a stronger increase in temperature. Therefore, generally a temperature drop from roller center or center of a bale to the roller edges or edges of a bale will be noticeable. Therefore, a thermal crowned surface appears which supersedes the crowned grinding of the roller.

Therefore, it has been suggested to make use of the heat itself of the working rollers when rolling band-shaped material, for purposes of controlling the rollers themselves. This method, however, has not been adopted in practice. Therefore, it is an object of the present invention to provide a method for controlling the planeness during the cold rolling of band-shaped material in a roller stand, which will offer the possibility of not only bringing about by simple means a precise control of the rollers for avoiding faulty planeness, but also to have such control become effective for short periods.

These objects and other objects and advantages of the invention will appear more clearly from the following specification, in connection with the accompanying drawing, in which:

FIG. 1 diagrammatically illustrates a device according to the invention, in which behind the roller gap or bit there is arranged a band temperature measuring gauge in the form of an infrared temperature measuring instrument.

Figure 1:
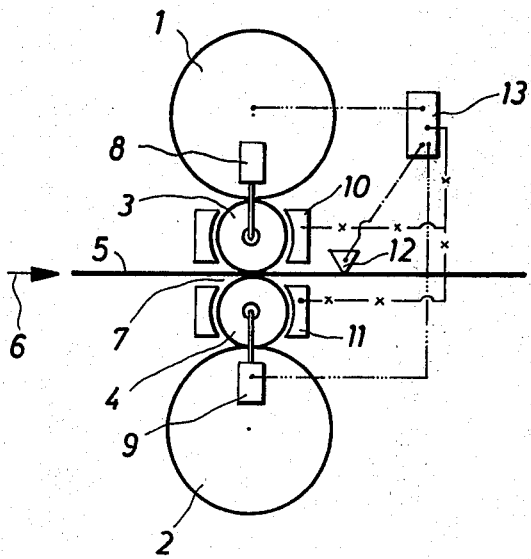

The method according to the present invention is characterized primarily in that directly behind the roller gap, the band temperature measured over the width of the continuously extending band is measured and the ascertained measurements are employed for causing the roller bending device to emit pulses or for causing the roller cooling device to emit pulses.

The present invention differs from the fundamental opinion of employing the temperature of the roller for controlling the planeness. The measuring of the roller temperature was based on the conception that the surface temperature of the roller is easier to measure and might be easier to control than the surface of the band. The present invention, however, does not share this assumption and is based on the conception that the band heat is a direct function of the shaping operation, whereas the heat of the roller is a factor which is derived from the heat of the band. This means that when a band passes through the roller gap, the heat generated by the form-shaping work of the band can immediately be measured on the band, whereas this is not immediately possible, for instance, when beginning a rolling operation on a roller which is cool at the start, or when varying form-shaping operations. Only in the course of the rolling itself the rollers are heated, and only then can the temperature of said rollers be taken, which fact does not permit a short time response of the control devices.

Inversely, with a rolling temperature measuring operation, still another control is effected even though the band does not need another control, because the temperature of the roller cannot instantaneously be reduced when the form-changing operation ceases. The method according to the present invention furthermore has over a roller temperature control that advantage that the thermal crown shape of the rollers can be influenced independently of the temperature of the band, which means that the heat measuring value transferred by the shaping operation onto the roller does not superimpose the cooling value of the roller. Both values can rather be ascertained independently of each other and the pulse emission may be effected on the basis of the separately ascertained measuring values.

According to a further development of the invention, a further temperature measurement may, in front of the rolling gap, be effected over the width of the band. To this end, the results of the temperature measurements are compared with each other ahead and behind the roller gap. The comparative value determines the pulse emission of the roller bending device and/or the cooling device. In this way, not only relative values over the width of the band are obtained as in the manner of a measurement behind the roller gap, but also in the longitudinal direction of the band effective differences in measurements are obtained which furnish information about the shape-forming operation.

In addition to the above mentioned measurements, also the surface temperature over the length of at least one of the working rollers may be compared with the temperature over the width of the band behind the roller gap, and the values of comparison determine the emission of pulses of the roller bending and/or the cooling device. Due to this comparative measurement it is possible to ascertain to which extent a temperature deduction for transfer from the band to the roller will be effected during the rolling operation itself.

The values ascertained in the above outlined manner may additionally be employed for controlling the band speed.

The device according to the present invention for practicing the method of this invention provides directly behind the roller gap a temperature measuring device which extends over the width of the moving band in a contact-free manner, preferably in the form of an infra-red device, which is connected to a control device for an adjusting device for bending through or deformation effectiveness of the rollers and/or a cooling device for the rollers.

In this connection, the band measuring device behind the roller gap and a rolling temperature measuring device may be connected to a calculating unit for controlling the roller cooling and/or the roller bending device, and also an additional band temperature measuring device in front of the roller gap may be connected to said calculating device. The band measuring device may behind the roller gap and the roller temperature device be connected to a calculating device for controlling the water cooling and/or the roller turn-on device. In addition thereto, a further band temperature measuring device in front of the roller device may be connected to said calculating device.

Referring now to the drawing in detail, the roller stand illustrated therein comprises, in a manner known per se, the two supporting rollers 1, 2 and the working rollers 3,4 between which the band 5 is moved in the direction of the arrow 6 through the roller gap 7. Each roller gap of the working rollers 3, 4 has associated therewith an adjusting device 8,9. Also arranged adjacent each working roller there may be provided one or two cooling device or devices 10, 11.

The direction of movement of the band 5 behind the roller gap 7 is a contact-free band temperature device 12 arranged over the width of the band. This band may be an infra-red measuring device or may be another contact-free measuring device which in a stepless manner or in steps works the width of the band. This measuring device 12 is, through a pulse emitter 13, connected to the adjusting devices 8,9 or the cooling devices 10, 11 respectively. The adjusting devices 8,9 bring about a bending of the rollers 3,4 to such an extent that the roller stand itself cannot bring about any errors in the planeness.

Figure 2:
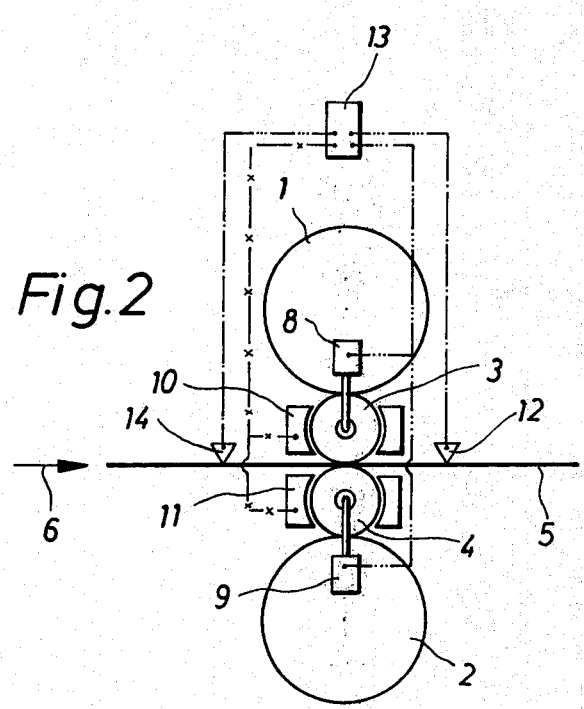
FIG. 2 shows a device according to the invention, in which in front and behind the roller gap there is respectively a band temperature measuring device.

According to the embodiment of FIG. 2, the same elements are used as with the device of FIG. 1. Only in front of the roller gap 7 there is provided a further temperature measuring device 14 which is likewise connected to the pulse emitter 13. Between the two temperature measuring devices 12, 14 and the pulse emitter there may be provided a calculator, if this should be desired.

Figure 3:
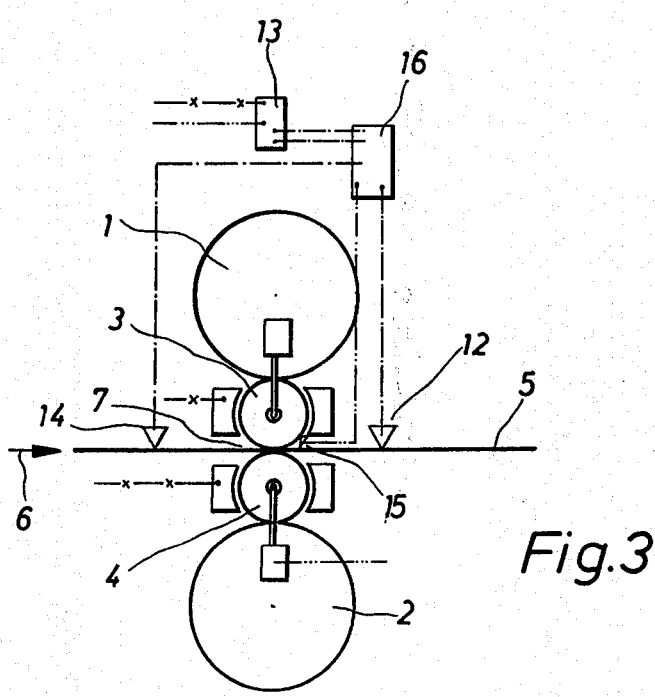
FIG. 3 shows a device according to the invention, in which the measuring of the band in front and behind the roller gap, as well as a measuring of at least one of the rollers of the roller stand is effected.

According to FIG. 3, in addition to the two temperature measuring devices 12, 14, there is in front and behind the roller gap 7 provided still another temperature measuring device 15 which is so arranged on one of the two rollers 3,4 that three temperature measuring values are obtained, namely, one in front of the roller gap, a second behind the roller gap and a third at the roller surface. These measuring results are fed to a calculator 16, which in its turn feeds the pulse emitter 13, which similar to the embodiment of FIGS. 1 and 2 is connected to the adjusting devices 8,9 of the rollers and to the cooling devices 10, 11 of the working rollers.

The teaching of the present invention covers a temperature measuring device; this means that there is involved a device which detects temperature fluctuations of the band directly behind the roller gap. The temperature differences over the width of the band provide or give the size of magnitude of the particular impulse for turning-on the adjusting device of the rolling mill.

There is emphasized that the impulse becomes transmitted or given onto an adjusting device for bending through of the rollers. There is clearly expressed that this is not an infra-red control device (yes/no device), but that there is rather involved a thermometer device that measures the band temperature differences and accordingly measures the rising and falling of the temperature.

According to the teaching of the present invention, a faulty area of the band becomes recognized already when leaving the roller gap and coming onto the temperature measuring device arranged directly behind the roller gap. Aside therefrom there has been found that the correction of the band with the aid of tension measurements does not fulfill the expectations which were hoped to be gained therefrom. However, there is stressed that previously one was dependent upon such a band tension or band pulling measuring since no other means were known.

Important is the concept of measuring the temperature of the band directly behind the roller gap in order herefrom to gain a size or magnitude respectively for the cooling of the rollers whereby the advantages include the speed of its reaction.

The temperature measuring device for measuring the temperature of the band can be such as it is used in a known manner for measuring the temperature of the rollers, naturally, however, with a corresponding flattening of the measuring head. Such temperature measuring devices are known to every average man skilled in the art.

The same is true with respect to the control of the adjustment device respectively of the cooling device. Such device is built up in a manner analogous to the control device provided by U.S. Pat. No. 3,587,265— Sivilotte for the tension with respect to the cooling of the rollers. The average man skilled in the art at most would be able to derive the control switching principle of the present invention from the device of Sivilotte.

The temperature detectors measure the band and thus, when compared with the roller temperature measuring devices, have the advantage set forth in the introductory paragraphs of the present disclosure and have in addition thereto the likewise described advantage, when compared with belt or band tension measuring means, of an immediate and short time interval impulse giving and of an essentially greater independence from the speed of the band which in a known manner influences to a considerable degree the tension of the band.

As to the relationship between sensed temperature fluctuations and degree of roll bending, there is specifically set forth that the bending heat is a direct function of the shaping operation, whereas heat of the roller is a factor which is derived from the heat of the band.

The main object of this invention is a method for improving the flatness of metal strips during cold rolling according to which the temperature of the rolled strip is measured over the width thereof behind the rollers of the mill and employing the measured values for controlling said rollers.

Another object of this invention is a device for controlling the flatness of the metal strip when rolling same in a mill, which includes a pair of rollers forming a roller gap and adapted in a continuous manner to receive there between a strip to be rolled, control means operatively connected to said rollers for controlling the same, and an infra-red measuring device arranged directly behind said roller gap and extending over the width of the strip to be rolled, and operatively connected to said control means for actuating same.

The teaching of the present invention is the control of the rolls of a cold rolling mill as a function of the temperatures of the rolled strip measured directly behind the rollers of a rolling stand.

The invention concerns a method and apparatus for regulation of planeness during rolling of a band or belt material. Flaws in planeness which reduce quality of rolled band material are attributable to unsuitable band warming or flawed rolling. Lack of planeness results in occurrence of bumps or beads arising either directly during rolling and/or such beads or bumps which arise during separation of the rolled band. Such bumps or beads cannot be eliminated sufficiently either during post rolling or during directing of the band so that the occurrence of beads by way of flawed rolling must be precluded in the roller frame. A geometric grasping or picking up (detecting) of the planeness flaws becomes precluded because of the smoothening influence of the band drawing or pulling; a comparison measurement of the band thickness distribution over the band width previously has not led to success. No planeness measuring devices with which the tension distribution becomes measured over the width of the band by means of expansion measuring strips involves the disadvantage that the functional efficiency becomes negatively influenced by way of roller oil, that springs off or similar impurities.

With a further known method for regulation of planeness there is utilized as an adjustment magnitude for the roller bending devices for adjustment of the roller camber or amount of crown the secondary warming or heating of the working rollers which becomes effected by way of the primary warming or heating of the belt as a consequence of form changing work during rolling. A control or regulating device operating according to the control method performs very inaccurately since the delayed heating of the working rollers requires relatively long response distance by way of the rolled band during the rolling procedure and there occurs still a regulation by way of the slow cooling off of the working rollers upon elimination of planeness flaws in the form of "long locations" in the band where the same is no longer necessary.

The present invention has an object as a basis thereof to create a method and apparatus for regulation or control of the planeness during rolling of band material which makes possible an accurate and brief or short time regulation of the rollers for avoidance of planeness flaws or errors.

Inventively this object becomes resolved by way of a control or regulating method with which there occurs a contact-free, zoned measurement of the band temperatures over the band width behind the roller gap seen in rolling direction so that a median value of the band temperature becomes determined as a guide magnitude of the planeness regulation; and furthermore, the temperature difference between the band zone temperatures behind the roller gap and median value of the band temperature becomes formed as an adjustment magnitude for the regulation of the cooling median supply and zoned engagement of the roller bending device for adjustment of the roller camber or amount of crown thereof.

According to a further feature of the novel method, the formation of the median value of the band temperature can occur in two manners, namely, from the band zone temperatures measured either before or after the roller gap.

The median value of the band zone temperature behind or after the roller gap is the adjustment magnitude for regulation of the conveying pump for the cooling median; and furthermore, the temperature differences between the band zone temperatures behind the roller gap and the median value of the band temperature transmitted therefrom respectively the temperature differences between the band zone temperatures behind the roller gap and the median value of the band zone temperatures before the roller gap result in the adjustment magnitude for the regulation of the actuating valves of the cooling device for the roller zones which correspond to the band zones.

The present invention furthermore concerns a control device for carrying out the method and regulation of the planeness during rolling of band material which provides a measuring device operating contact free as arranged behind the roller gap with measuring units detecting the band width for measurement of the temperature of band zones arranged over the band width; furthermore, there is involved a temperature signal utilization for the signals transmitted from the temperature measuring device and a middle or median value forming and formation of median value out of the signals received from the temperature signal utilization and a regulator for the roller cooling means pump which becomes controlled by way of the starting or output signal of the temperature median value forming means as well as a difference forming means and determining of the temperature differences out of the band zone temperature as a guide magnitude as well as a logic which becomes supplied by way of temperature-difference-output signals of the difference forming means for stepwise regulation of the actuating valves of the cooling device for the roller zones. With this first embodiment of the regulating device there occurs a determination of the middle or median band temperature by way of the median value forming means from the band zone temperature behind the roller gap.

With the determination of the median value of the band temperature out of the band zone temperatures before the roller gap there becomes supplemented the aforementioned or described regulating device by way of a measuring device operating free of contact as arranged before the roller gap as well as an additional temperature signal utilization for the signals transmitted from the temperature measuring device as well as a median value forming means and median value formation out of the signals received from the temperature signal utilizing means.

A further advantageous embodiment of the regulating device consists therein that the contact-free temperature measuring device is embodied as an infra-red measuring device with measuring heads arranged over the band width.

An advantageous implementation of the inventive regulating device finally can also be seen therein that an indicator device is connected to the difference forming means for indicating the divergence of the band zone temperatures from the median value of the band temperature.

The regulating devices operating according to the novel regulating or control method immediately indicates arising flaws or errors in planeness in the rolled band as "longitudinal locations" and regulates these by way of strengthened or reduced zoned spraying of colling means upon the working rollers. A further advantage of the invention consists therein that by way of the quick response of the regulating devices there becomes hindered the swinging up of the localized heating of rollers and roller material.

Additional details of the invention are provided in the following paragraphs describing two embodiments of the novel control or regulating device utilized with a quarto-roller mechanism.

Figure 4:
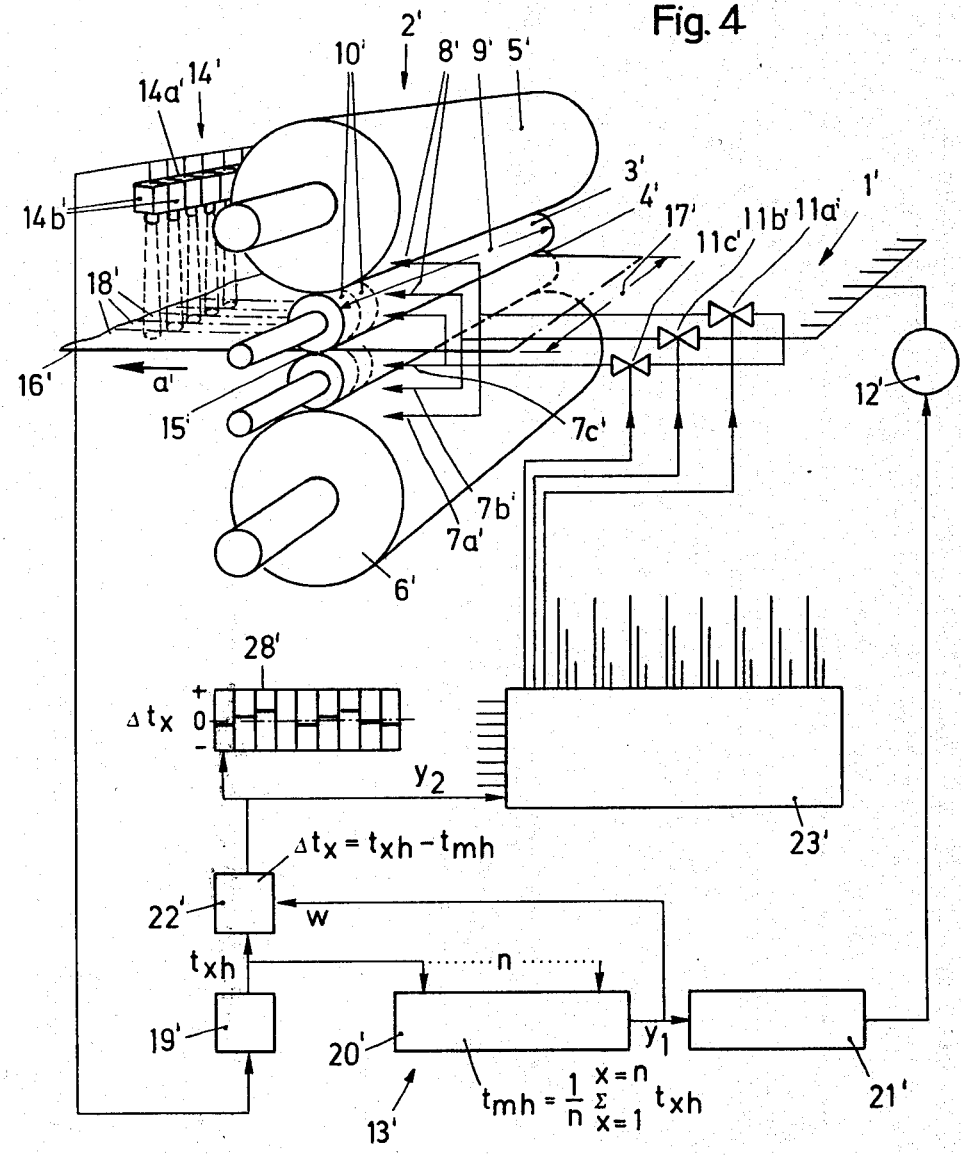
FIG. 4 is a schematic representation of an arrangement for roller cooling with a first embodiment of a control device used for a quarto-roller mechanism including a block diagram of a control circuit therewith.

The rolled cooling device which according to FIG. 4 having quarto-roller mechanism 2' with upper and lower working rollers 3', 4', as well as upper and lower support rollers 5', 6', provides nozzle stakes 7' with spray jets 8' which are arranged over the roller width 9' of the working roller means 3', 4'. The cooling medium becomes sprayed upon the individual roller zones 10' with the aid of spray jets 8' according to particular requirement and the regulating of the actuating valve means 11a', 11b' and 11c' of the nozzle stakes 7', as well as the cooling medium pump means 12' occurs by way of the described control device 13'.

The temperature measuring device 14' is arranged behind the roller gap 15' as seen in roller direction $a'$; and there is an infra-red measuring device 14a' embodied with measuring heads 14b' arranged over the band width 17' of the rolled band 16' so as to measure the temperatures $t_{xh}$ of the zones 18' into which the band 16' is divided over the width 17' thereof. The band zone temperatures $t_{xh}$ measured by the infra-red measuring device 14a' become transmitted as signals of a temperature signal utilization means 19' and become amplified thereby, respectively becoming adjusted or set thereby. A middle or median value forming means 20' forms the middle value that can be divided as follows:

$$t_{mh} = \frac{1}{n} \sum_{x=1}^{x=n} t_{xh}$$

This represents the middle value of the band temperature from the signals $t_{xh}$ received by the temperature signal utilization means 19'. In this equation (1) there are letters that represent the following:

$n$ represents the number of the measuring heads 14b' of the infra-red measuring device 14a', and is equal to the number of band zones 18'

$t_{xh}$ represents band zone temperature

The output signals $t_{mh}$ of the middle value forming means 20' form the adjusting magnitude $y_1$ for the regulator 21', which controls or regulates the cooling means quantity of the roller cooling means 1' by way of the speed respectively the conveying height or level of the cooling medium pump 12'. The difference forming means 22' determines the temperature difference expressed as an equation $$\Delta t_x = t_{xh} - t_{mh}$$

from the band zone temperatures $t_{xh}$ behind the roller gap 15' and the middle value $t_{mh}$ of the band zone temperatures $t_{xh}$ as the guiding magnitude "$w$" of the control or regulating means. The logic means 23' which becomes supplied by way of the adjustment magnitude $y_2$ forming temperature-difference output signals $\Delta t_x$ of the difference forming means 22' opens and closes stepwise the actuating value means 11a', 11b', and 11c' of the nozzle bars, rods or stock 7a', 7b' and 7c' arranged at to the individual roller zones corresponding to the temperature divergents $\Delta t_x$ in the individual band zones 18' from the middle value $t_{mh}$ of the band temperature.

Figure 5:
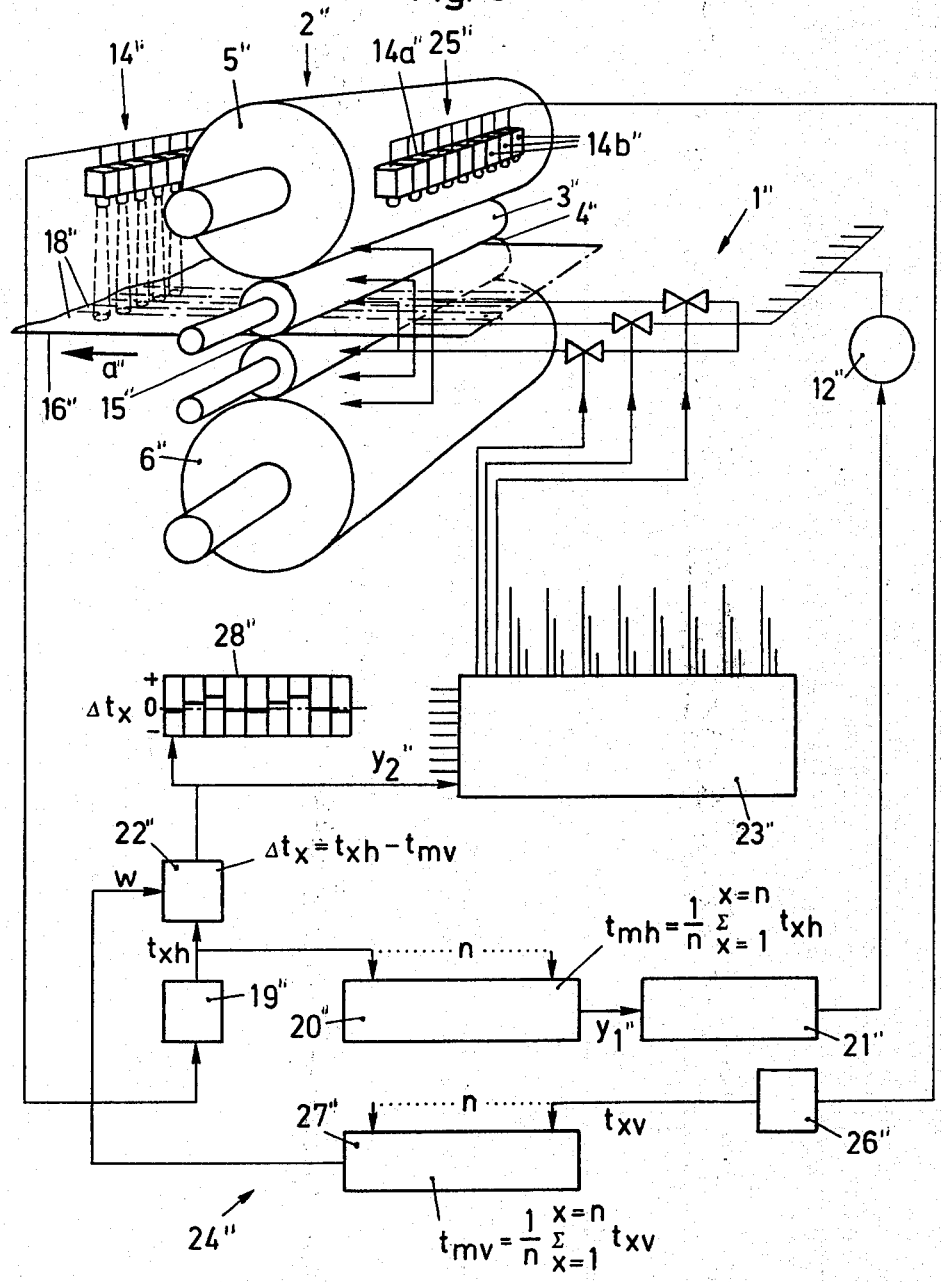
FIG. 5 shows a second embodiment of a control device for roller cooling of a quarto-roller mechanism.

The control device 24'' according to FIG. 5 differs from the embodiment 13' according to FIG. 4 by way of the formation of the middle value $t_m$ of the band temperature. With the control or regulating device 24'' measurement occurs by way of a temperature measuring device 25'' arranged from the roller gap 15'' as seen in roller direction $a''$ and this corresponds to the infra-red measuring device 14a' of the control or regulating device 13' measuring the temperatures $t_{xv}$ of the band zones 18'. The measured band zone temperatures $t_{xv}$ become transmitted as signals of the temperature signal utilizing means 26'' and become amplified, respectively adjusted or set accordingly. A middle value forming means 27'' forms the middle value of the band temperature out of the signals $t_{xv}$ received by the temperature signal utilizing means 26'' and this can be defined in an equation as follows:

$$t_{mv} = \frac{1}{n} \sum_{x=1}^{x=n} t_{xv}$$

An indicating device 28'' connected to the difference forming means 22'' with the control or regulation device 13', 24'' indicates the divergences $\Delta t_x$ of the band zone temperatures $t_{xh}$ from the middle value $t_{mh}$ respectively $t_{mv}$ of the band temperatures as well as the temperature distribution along the rolled band 16'' during discharge from the roller gap 15''.

The planeness flaws arising during rolling of band material cause "longitudinal locations" which effect an increase of the band temperature by way of an amplified or strengthened form changing work and these become indicated immediately by way of the temperature measuring device of the control or regulating device and the same becomes adjusted or regulated out by way of increased or decreased spraying of cooling median upon the working roller zones corresponding to the divergents of the band zone temperatures from the middle values of band temperature and the absolute height or level of the middle band temperature. It is, of course, to be understood that the present invention is, by no means, limited to the specific showing in the drawings, but also comprises any modifications within the scope of the appended claims.

What I claim is:

1. A temperature measuring method of controlling the planeness of band-shaped material when cold-rolling the same in a rolling stand, according to which the band to be rolled is passed through the roller gap between two rollers, which includes in combination the steps of continuously passing the band to be rolled through said gap while detecting and measuring the band temperature fluctuations over the width thereof directly behind said roller gap, and employing the thus measured values for emitting pulses for controlling effectiveness of said rollers.

2. A method in combination according to claim 1, in which the emitted pulses are employed for controlling the deformation effectiveness of said rollers.

3. A method in combination according to claim 2, in which the emitted pulses are employed for controlling the temperature of said rollers.

4. A method in combination according to claim 3, which includes the steps of: measuring the temperature of the band over the width thereof also directly in front of said roller gap, comparing with each other the ascertained temperatures of the band being rolled, and using the result of said comparison to determine said pulse emission.

5. A method in combination according to claim 4, which includes the steps of measuring the surface temperature over the length of one of said rollers and comparing it with the band temperature measured over the width of the latter and using the thus ascertained comparison value for determining the pulse emission for controlling the deformation effectiveness of said rollers.

6. A method in combination according to claim 5, which includes the steps of measuring the surface temperature over the length of one of said rollers and comparing it with the band temperature measured over the width of the latter and using the thus ascertained comparison value for determining the pulse emission for controlling the temperature of said rollers.

7. A temperature measuring device for controlling the planeness of band-shaped material when cold-rolling the same in a rolling stand, which includes in combination a pair of rollers forming with each other a roller gap therebetween and adapted in a continuous manner to receive therebetween a band to be rolled thereby, control means operatively connected to said rollers for controlling effectiveness thereof, and an infra-red temperature measuring device arranged directly behind said roller gap and extending over the width of the band to be rolled, and operatively connected to said control means for actuating the same.

8. A device in combination according to claim 7, in which said control means controls the deformation effectiveness of said rollers.

9. A device in combination according to claim 8, which includes cooling means associated with said rollers and operatively connected to said control means for controlling the temperature of said rollers.

10. A device in combination according to claim 9, which includes a band temperature detecting and measuring device arranged behind said rollers adjacent the path of the band to be rolled for measuring the temperature of the latter, a roller temperature measuring device associated with at least one of said rollers, and a calculating unit for controlling said rollers, said calculating unit being operatively connected to said band temperature measuring device and to said roller temperature measuring device.

11. In a method for regulation of band planeness during rolling of band material, the improvement therewith characterized by measuring of band temperatures in a contact-free and zoned manner over band width at location behind the roller gap seen in rolling direction and characterized further by forming of a middle value of band temperature as a guide magnitude of planeness regulation as well as by forming of a temperature difference between band zone temperatures behind the roller gap and the middle value of band zone temperatures as adjustment magnitude for regulate supplying of cooling medium for engagement of roller means in a zoned manner selectively for adjustment of roller camber.

12. In a method for regulation of band planeness during rolling of band material, the improvement therewith characterized by measuring of band temperatures in a contact-free and zoned manner over band width before and behind the roller gap and characterized further by forming of a middle value of band temperature before the roller gap as a guide magnitude of planeness regulation as well as by forming of temperature differences between band zone temperatures behind the roller gap and the middle value of band zone temperatures before the roller gap as adjustment magnitude for regulating supplying of cooling medium for engagement of roller means in a zoned manner selectively for adjustment of roller camber.

13. In a method according to claim 11 wherein the middle value of band zone temperatures behind the roller gap is determinative for regulating pump conveying of the cooling medium and wherein the temperature differences between the band zone temperatures behind the roller gap and the middle value of band zone temperatures are determinative for adjustment magnitude for stepwise regulating of actuating valve means of cooling apparatus for the roller zones that correspond to band zones.

14. In a method according to claim 12 wherein the middle value of band zone temperatures behind the roller gap is determinative for regulating pump conveying of the cooling medium and wherein the temperature differences between the band zone temperatures behind the roller gap and the middle value of band zone temperatures before the roller gap are determinative for adjustment magnitude for regulating of actuating valve means of cooling apparatus for the roller zones that correspond to band zones.

15. A regulating apparatus with a cooling device for roller zones of planeness during rolling of band material in zones having a band width that passes through a roller gap comprising: a temperature measuring device arranged behind the roller gap in an operative arrangement free-of-contact with the band material to provide signals and including measuring units that have a range to correspond with band width for measurement of temperatures of band zones arranged over the band width, a temperature-signal-working means for signals transmitted from said temperature measuring device, a temperature middle-value-forming means for formation of middle values out of signals received from said temperature-signal-working means, a regulation means and a roller-cooling-medium means, a regulator means and a roller-cooling-medium pump means therewith controlled by signals from the temperature-middle value-forming means, a temperature-difference-forming means for determination of temperature differences out of signals received from said temperature-signal-working means and said temperature middle-value-forming means, and a logic means supplied with signals of said temperature-difference-forming means for stepless regulation of the cooling device for the roller zones.

16. A regulating apparatus with a cooling device having actuation valves for roller zones used in regulation of planeness during rolling of band material in zones having a band width that passes through a roller gap, comprising: a temperature measuring device arranged behind the roller gap in an operative arrangement free-of-contact with the band material to provide signals and including measuring units that have a range to correspond with band width for measurement of temperatures of band zones arranged over the band width, a temperature-signal-working means for signals transmitted from said temperature-measuring device, a temperature-middle-value-forming means for formation of middle values out of signals received from said temperature-signal-working means, a regulator means and a roller cooling medium pump means therewith controlled by signals from the temperature-middle-value-forming means, a further temperature measuring device arranged before the roller gap in an operative arrangement free-of-contact with the band material to provide signals corresponding to zoned measurement of band temperatures over the band width, a further temperature-signal-working means for said further temperature measuring device as to signals transmitted before the roller gap, a further temperature-middle-value-forming means for formation of middle values out of signals from the temperature-middle-value-forming means, a temperature-difference-forming means for determination of temperature difference out of signals received from said further temperature-signal-working means and a logic means supplied with signals of said temperature-difference-forming means for stepless regulations of actuation valves of the cooling device for the roller zones.

17. A regulating apparatus according to claim 15 wherein said temperature-measuring device is an infrared measuring device including measuring heads arranged over the band width.

18. A regulating apparatus according to claim 16 wherein said temperature-measuring devices are infrared measuring devices including measuring heads arranged over the band width.

19. A regulating apparatus according to claim 15 wherein an indicator means is connected to said temperature-difference-forming means for showing divergence of band zone temperatures from middle value of the band temperature.

20. A regulating apparatus according to claim 16 wherein indicator means are connected to said temperature-difference-forming means for showing divergence of band zone temperatures from middle value of the band temperature.

* * * * *

UNITED STATES PATENT OFFICE
CERTIFICATE OF CORRECTION

Patent No. 3,990,284  Dated November 9, 1976

Inventor(s) Ernst H. Barten

It is certified that error appears in the above-identified patent and that said Letters Patent are hereby corrected as shown below:

On the cover sheet the assignee, should read

-- Achenbach Buschhutten GmbH, Kreuztal, Germany --.

Signed and Sealed this

Seventeenth Day of May 1977

[SEAL]

Attest:

RUTH C. MASON
Attesting Officer

C. MARSHALL DANN
Commissioner of Patents and Trademarks